(No Model.)

F. C. MOORE & J. C. THOMPSON.
COMBINED SCOOP AND SCALE.

No. 367,429. Patented Aug. 2, 1887.

WITNESSES

Fernando C. Moore
John C. Thompson
INVENTORS.
by E. B. Stocking
Attorney.

UNITED STATES PATENT OFFICE.

FERNANDO C. MOORE AND JOHN C. THOMPSON, OF GRINNELL, IOWA.

COMBINED SCOOP AND SCALE.

SPECIFICATION forming part of Letters Patent No. 367,429, dated August 2, 1887.

Application filed September 24, 1886. Serial No. 214,436. (No model.)

*To all whom it may concern:*

Be it known that we, FERNANDO C. MOORE and JOHN C. THOMPSON, citizens of the United States, residing at Grinnell, in the county of Poweshiek, State of Iowa, have invented certain new and useful Improvements in Combined Scoop and Scale, of which the following is a specification, reference being had therein to the accompanying drawings.

This invention has relation to a combined scoop and scale, and our object is to provide a device of the above character whereby sugar, flour, and like stuffs may be scooped from bins, barrels, &c., and weighed without the necesssity of walking to the counter or other place where the scales are situated.

A further object of our invention is to simplify the construction, reduce the cost of manufacture, and to provide an attachment whereby the scoop or scale may be rested upon a convenient bin or barrel, the scale being held in a vertical position and accurate weight given.

With these and other objects in view the invention consists in certain features of construction, hereinafter specified, and particularly pointed out in the claims.

Figure 1:
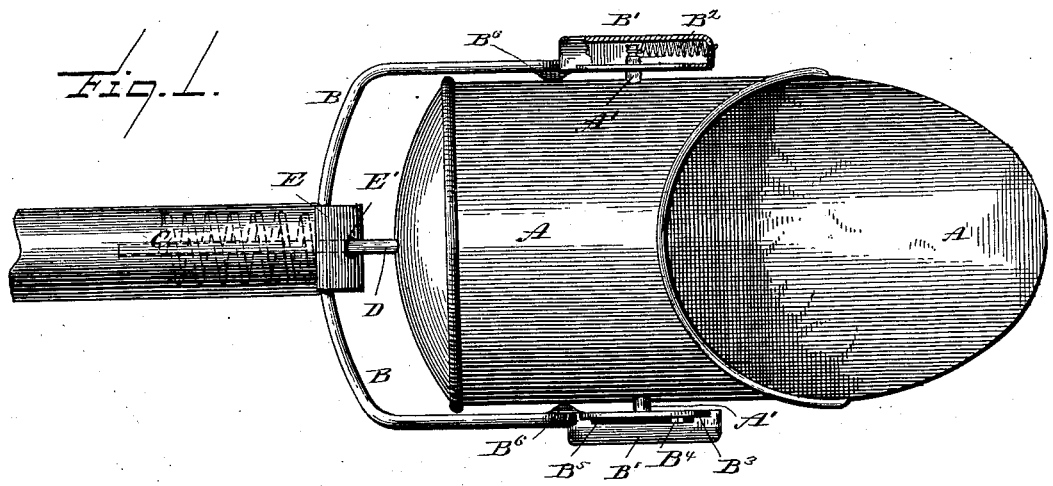
Figure 2:
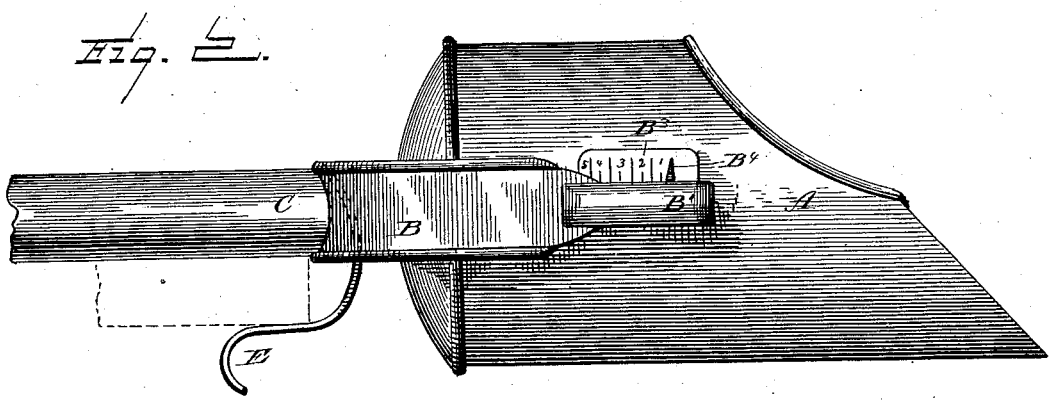
Figure 3:
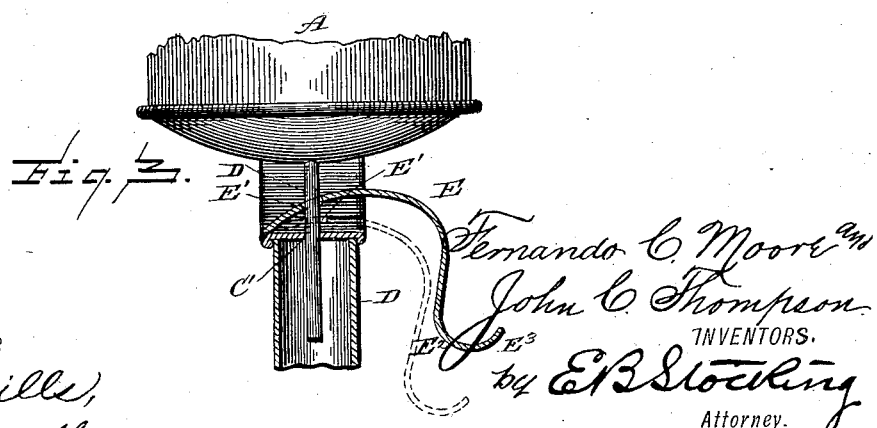

Referring to the drawings, Figure 1 is a plan view, and Fig. 2 a side elevation, of a combined scoop and scale constructed in accordance with our invention. Fig. 3 is a sectional detail of a modification hereinafter referred to.

Like letters indicate like parts in all the figures of the drawings.

A represents the body portion of a scoop, at each side of which are formed or secured diametrically-opposite lugs A', which project into housings B', the inner faces of said housings being longitudinally slotted for a purpose hereinafter described. Interposed between the forward ends of the housings and the lugs A', to which latter they may be secured, are coiled springs $B^2$, and extending from the slotted plate of one of the housings is an indicating-plate or gage, $B^3$, over which an indicator, $B^4$, is adapted to move, said indicator being rigid with the lug A' in said housing and extending through a longitudinal slot formed therein.

Extending rearwardly from each of the housings B' is a bail, B, which passes around under the closed end of the scoop and is rigidly connected with the housings. Connected with the bail B is a hollow sheet-metal handle, C, and projecting rearwardly from the center of the closed end of the scoop is a rod, D, which passes through the hole C' a short distance into the handle C, as shown in Fig. 3.

The springs $B^2$ may be of any number of pounds resistance desired, and the gage-plate is divided off and marked and numbered in accordance therewith, so that it is evident that sugar, for instance, being taken up by the scoop may be weighed by simply holding the scoop in a vertical position by means of its handle, thus obviating the necessity of taking the scoop to the scales for weighing, in which method several trips are sometimes necessary before the desired weight is obtained.

For the purpose of hanging the scoop up when not in use, and for assuring the scoop being held in a vertical position when in use, whereby binding of the parts is prevented and accurate weight therefor given, and as such stuffs are generally contained in barrels or bins, we have provided an attachment whereby the scoop, after being filled or partially so, may be clamped to the bin or barrel in such a manner as to be readily applied and removed, and when so applied will be rigidly held in a vertical position. This device consists of a metallic resilient clamping-plate, E, which is secured at one edge of the bail B, and is perforated at E' for the passage of the rod D, or it may be located at one side of said rod; but, for a purpose hereinafter described, it may be mounted as herein shown in Figs. 1 and 3. After passing between the end of the scoop and the bail B, the plate is bent to form a clamping portion, $E^2$, between which and the hollow handle may be entered the edge of a bin or barrel or other convenient ledge, the spring-clamp being pressed outwardly to admit of the entrance of the edge of the bin or barrel. As before stated, this hook, when the scoop is not in use, may serve as a means whereby the same may be suspended either from a bin or nail.

As it is undesirable that the springs should give when the open end of the scoop is forced into a mass of flour or sugar, we have provided means for preventing this objection and maintaining the scoop rigid with the handle during this operation. This we accomplish by forming the aperture E' somewhat larger than the rod D, so that by placing the forefinger upon the curved lip E³ the spring will be brought to the position shown by dotted lines, Fig. 3, and one edge of the aperture E' will bind upon the rod D, whereby it will be prevented from reciprocating within the hollow handle. When released from pressure, the spring will naturally rise, so as to permit an unobstructed reciprocation of the rod therethrough.

Upon the inner face of the bail B, adjacent to the cylindrical portion of the scoop, there are formed guiding projections B⁶, which serve to guide the scoop in its reciprocations within the bail, whereby that function is not performed by the lugs A', which reciprocate within the housings, the object being to reduce the friction to a minimum, and thereby tend to greater accuracy in weighing.

If desired, and so far as the clamping-plate E is concerned, the spring, instead of being mounted at the sides of the scoop, may be contained within the handle, (see dotted lines, Fig. 1,) the indicator and index being fixed at any suitable point, either on the handle or at the side of the scoop, as shown.

Having described our invention and its operation, what we claim is—

1. In combination with a combined scoop and scale, a suspension-clamp, as E, for connection with a bin or other object, substantially as specified.

2. In a scoop of the class described, a suspension and binding clamp, as E, adapted for connection with a bin or other object, substantially as specified.

3. The combination, with the handle C, provided with the bail B, guiding projections B⁶, and housings B', of a scoop, A, having lugs A', projected into the housings and connected therewith by springs B², an indicating-scale, B³, an indicator, B⁴, and a rod, D, passing from the rear of the scoop into the handle, substantially as specified.

4. The combination of the scoop A, having the rod D, the handle C, having the bail B, and the suspension-spring E, substantially as specified.

5. The combination of the scoop A, having the rod D, the handle C, having bail B, and suspension-spring E, perforated for the passage of the rod D therethrough, substantially as specified.

6. The combination of the scoop A, having lugs A' and rod D, the bail B, having projections B⁶ and housings B', the springs B², the indicator B⁴, scale B³, the handle C, and the spring-clamp c, substantially as specified.

In testimony whereof we affix our signatures in presence of two witnesses.

FERNANDO C. MOORE.
JOHN C. THOMPSON.

Witnesses:
D. W. NORRIS,
A. L. PRESTON.